United States Patent Office 3,487,725
Patented Jan. 6, 1970

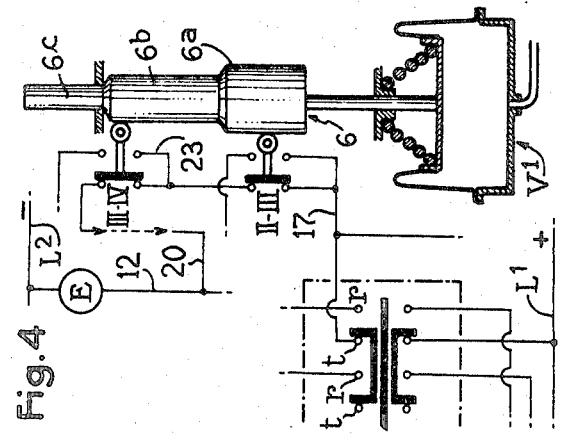
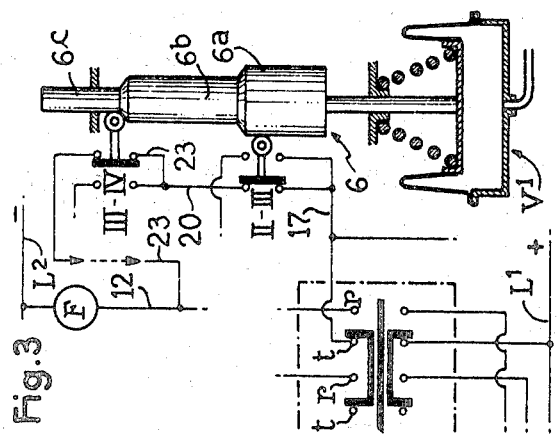
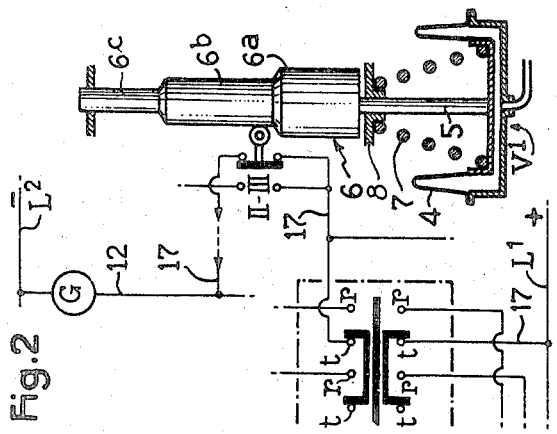
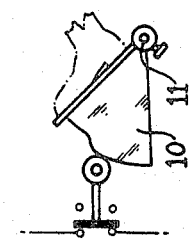

3,487,725
DEVICE FOR CONTROLLING AN AUTOMOBILE VEHICLE GEARBOX
Jean Paul Brunot, Sens, France, assignor to Centre de Recherches de Pont-a-Mousson, a French body corporate
Filed Feb. 29, 1968, Ser. No. 709,406
Claims priority, application France, Mar. 31, 1967, 100,962
Int. Cl. F16h 3/74
U.S. Cl. 74—752               10 Claims

ABSTRACT OF THE DISCLOSURE

A control device for a gearbox having a pilot device responsive to the output shaft speed of the gearbox, and comprising in combination a hydraulic actuating device for actuating a mechanical automatic change speed means, said hydraulic device being connected by a first conduit to said pilot device which feeds thereto oil under variable pressure as a function of the shaft speed. Electric switches controlling the engagement of the speeds are actuated by said mechanical means. An electrovalve closes said first conduit for locking the engaged transmission ratio. The electrovalve comprises two energization circuits one of which comprises a manually-operated closing switch whereas the other comprises two switches connected in series and respectively automatically closed by means responsive to said pressure and means responsive to the closure of the throttle of the vehicle.

---

The present invention relates to the control of gearboxes for automobile vehicles, said boxes being of the type having permanently meshed gears and in which certain forward speeds are engaged by means of an automatic distribution of fluid under pressure to actuators or jacks tightening brake bands.

The object of the invention is to provide a control of such a gearbox, said device being of the type comprising hydraulic means and electric means actuated by a hydraulic pilot device responsive to the speed of the vehicle. The device according to the invention comprises in combination: a hydraulic actuating device for actuating a mechanical change speed means, said hydraulic device being connected by a first conduit to said pilot device which feeds thereto oil under variable pressure as a function of the speed; electric switches controlling the engagement of the speeds actuated by said mechanical means and, on said first conduit, an electrovalve closing said first conduit for locking the engaged transmission ratio, said electrovalve comprising two excitation circuits one of which comprises a manually-operated closing switch whereas the other comprises two switches connected in series and automatically actuated by intermediate actuating means.

According to one feature of the invention, one of the switches locking the engaged transmission ratio is actuated by a disc cam which is connected to move with the accelerator pedal.

With this improved control device, the driving of an automobile vehicle under difficult conditions requiring many changes of speeds or transmission ratios offers all the desirable conditions of reliability and convenience so that the work of the driver is considerably reduced.

Moreover, this control device offers the advantage of great sturdiness and very little required maintenance.

Another object of the invention is to provide a transmission unit for an automobile vehicle comprising in combination: a gearbox of the type having gears permanently meshed and in which some forward speeds are engaged owing to the automatic distribution of fluid under pressure to actuators or jacks tightening brake bands, and the aforementioned control device.

Further features and advantages of the invention will be apparent from the ensuing description with reference to the accompanying drawings.

In the drawings:

FIG. 2 is a partial view corresponding to FIG. 1, of the control device in the position corresponding to the second speed ratio;

FIGS. 3 and 4 are partial views similar to FIG. 2 of the control device in the position corresponding to the third and fourth speed ratios;

FIG. 5 is a table showing which electromagnets are active for engaging the various transmission ratios, the "+" sign indicating that the electromagnet is active and the "—" sign indicating that the electromagnet is at rest, and FIG. 6 is a detail view.

(I) DESCRIPTION

Figure 1:
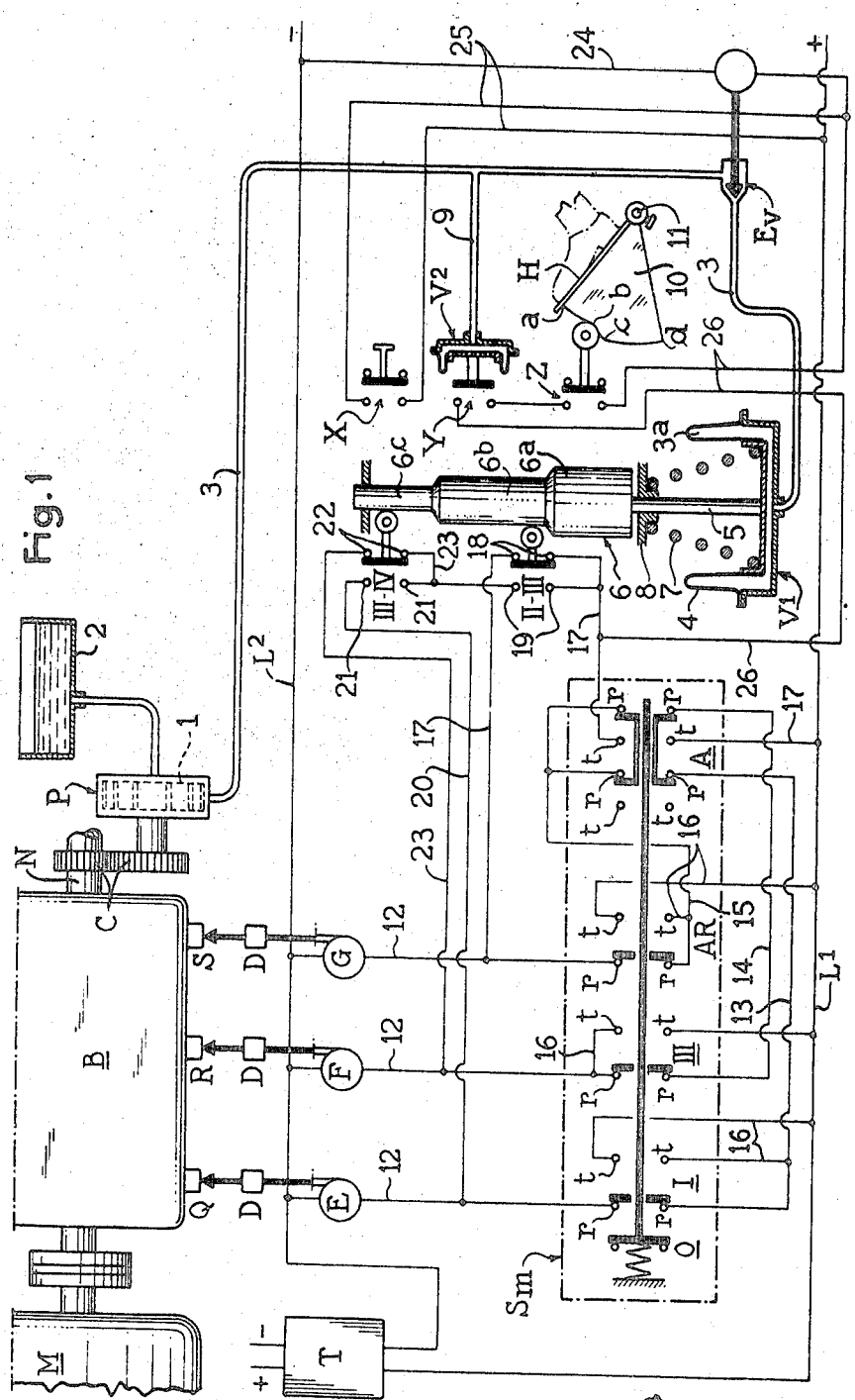
FIG. 1 is a diagrammatic view of a control device according to the invention.

The invention will be described as applied to a transmission unit in which the torque of an engine M is transmitted to a gearbox B. The latter is of any known type having permanently meshed gears and transmits the driving torque to the wheels of the vehicle through an output shaft or driven shaft N. It affords, for example, four forward ranges or speed ratios or speeds: namely first (I), second (II), third (III) and fourth (IV), and a reverse speed (AR) each of which is engaged by the admission of oil to at least one of three actuators or jacks Q, R, S fed by distributors D controlled by three electromagnets E, F, G. In FIG. 1, the jacks Q, R, S, their oil distributor D and electromagnets E, F, G have been shown merely symbolically since all these devices are of well-known types.

The states of the electromagnets for the various transmission ratios are explained by the table shown in FIG. 5 which indicates:

For the neutral position (O), the three electromagnets are de-energized;

For the first speed (I), the electromagnets F and G are energized;

For the second speed (II), only the electromagnet G is energized;

For the third speed (III), only the electromagnet F is energized;

For the fourth speed (IV), only the electromagnet E is energized;

For reverse speed (AR), the electromagnets E and F are energized.

There will now be described in succession the hydromechanical part of the control device which comprises a pilot device P responsive to the speed of the vehicle, that is, the speed of the driven shaft N, and an automatic means actuating electric switches, and then the electric part of the control device which comprises feed circuits for the electromagnets E, F, G and, in these circuits, in parallel manual control contacts, automatic control electric switches and in particular, switches for locking transmission ratios and for the return to the second speed, combined with the hydromechanical part of the control.

In FIG. 1, the oil conduits are shown by a double line whereas the electric connections are shown by a single thin line. The various devices employed are of known type and shown symbolically.

For the reasons of simplification and clarity, the circuit supplying fluid under pressure, for example oil, to the jacks or actuators Q, R, S, which circuit passes through the distributors D, has not been shown since it is of well-known type.

*Hydraulic and mechanical part.*—The brain of the hydraulic part of the control device according to the invention is the pilot device P. This device comprises a bladed wheel 1 driven in rotation by the output shaft N of the gearbox through a pair of gears C. It is fed with oil under pressure by a tank 2 having a pressure head and delivers this oil by way of an outlet conduit 3 to servos at a pressure which varies directly with the speed of the shaft N.

The conduit 3 leads to a first servo $V^1$, for example having a diaphragm 4, which shifts the rod 5 of a stepped cam 6. The latter for example consists of a cylindrical member having three steps, that is, three portions of decreasing diameters $6^a$, $6^b$, $6^c$. The diaphragm 4 of the servo $V^1$ is subjected to the opposing pressures of the oil and of a spring 7 which bears against an abutment 8.

As will be clear hereinafter, the stepped cam 6 is adapted to actuate a pair of double switches II/III and III/IV for the automatic engagement of the transmission ratios between the second and third speeds on one hand and the third and the fourth speeds on the other. The circuit 3 is capable of being closed by an electromagnetically operated valve or electrovalve $E_v$ having a needle and winding. When this electrovalve is energized under the conditions explained hereinafter, the oil from the pilot device P can no longer reach the first diaphragm servo $V^1$ and the oil within his servo remains trapped therein.

Connected to the circuit 3 on the upstream side of the valve $E_v$, is a branch conduit 9 feeding a second diaphragm servo $V^2$ of smaller size than the servo $V^1$ since it merely serves to actuate a switch Y for returning to the second speed, as will be explained hereinafter.

Independently of the aforementioned hydraulic part, but in combination with the electric part and with the accelerator pedal H of the vehicle, is a disc cam 10 in the form of a circular sector having the same pivot axis 11 as the accelerator pedal H of the vehicle and capable of being rotated with said pedal. The profile of this cam 10 comprises a portion *ab* of small radius and a portion *cd* of greater radius which are interconnected by an oblique shoulder *bc* and co-operate with a locking switch Z locking an engaged transmission ratio. This switch Z is raised and therefore open when it is in alignment with the portion *ab* of small radius and is depressed and therefore closed when it faces the portion *cd* of large radius.

*Electric part.*—This is the part which actuates the electromagnets E, F, G engaging the various speed ratios. It is combined with the hydraulic part and the aforementioned mechanical means through switches which are actuated by the mechanical and hydraulic means or, on the contrary, actuate the latter.

In FIG. 1, the electric part of the control device has only been shown symbolically so as to illustrate the principle. Thus for reasons of clarity, a number of connections, resistances, diodes and capacitors which are essential to the good operation of the device but well known to those skilled in the art, have been omitted.

This electric part therefore comprises a supply line having two conductors $L^1$ (positive) and $L^2$ (negative) connected to the battery of the vehicle. This line feeds a case T affording a time delay in the cutting off of the injection of fuel to the engine. This time delay is shown symbolically by a rectangle and is of known type, for example that sold by the firm Pesas. It comprises a relay controlled by an electric time device comprising static elements mounted on a printed circuit and furnishes electric pulses of adjustable duration at the moment of each changing up of the speeds but does not return the order at the moment of changing down the speeds. The electric pulses of the time delay T are adapted to cut off in a known manner the injection of fuel into the engine, that is, decrease the feeding of fuel to the engine at the moment of changing speeds without intervention of the driver. Such a control of the cutting off of the injection of fuel is essential to the good operation of the control device according to the invention but again is of known type so that for reasons of clarity and simplification it has not been shown.

Mounted in the electric circuit is a manual selector $S_m$, for example set into the control panel of the vehicle and including five contact pieces corresponding to neutral (O), first speed (I), third speed (III), reverse speed (AR) and to automatic operation (A). The first four contact pieces are single, the last is double and, with the exception of the neutral contact piece (O) which is purely mechanical, the various contact pieces co-operate with respective pairs of fixed contacts namely normally closed contacts *r* and normally open contacts *t* relating to the switches I, II, AR, A. The automatic operation contact piece A is double and co-operates with four pairs of contacts *r* of rest and two pairs of contacts *t* of operation.

These various contact pieces are mechanically connected in a known manner not shown so that the depression of the neutral contact piece (O) returns the other contact pieces to the rest studs *r* whereas each of these other contact pieces when depressed separately can be brought to its operation studs *t*.

The electromagnets E, F, G are successively connected by conductors 12 between the negative conductor $L^2$ of the line and a rest studs *r* of each of the control piece switches I, III and AR. The other rest contact studs *r* of these switches are respectively connected by connection conductors 13, 14, 15 respectively to four rest studs *r* of the two contact pieces of the automatic operation switch A, as shown in the drawing. Further, the operation studs *t* of the contact pieces I, III and AR are connected by feed conductors 16, on one hand, to the positive conductor $L^1$ of the supply line and, on the other hand, respectively to the conductors 13, 12, 15.

The two pairs of operation studs *t* of the double contact piece A comprise in fact one electrically inert pair simply serving as a mechanical abutment and an active pair electrically connected by a conductor 17 termed an automatic feed conductor, on one hand, to the conductor $L^1$ of the line and, on the other hand, to a point of connection on the conductor 12 of the intermediate electromagnet G between this electromagnet G and one of the rest studs *r* of the switch AR.

Connected in series in this conductor 17 is a first pair of studs 18 of the double switch II/III, the movable contact piece of which co-operates with the stepped cam 6 and more exactly with the portions $6^a$, $6^b$ of this cam. This contact piece can also bear against another pair of contact studs 19 of a conductor 20 which also passes through the pair of studs 21 of the second double switch III/IV whose contact piece co-operates with the cam 6. The conductor 20 is connected to the feed conductor 12 of the electromagnet E. The second pair of contact studs 22 of the switch III/IV is connected in parallel to the conductor 20 and to a conductor 23 connected to said conductor 20 and to the feed conductor 12 of the electromagnet F.

Each of the double switches II/III and III/IV respectively serve to change between the second and third speeds, on one hand, and between the third and fourth speeds on the other, and can then occupy two positions:

When the contact piece of the switch II/III bears on the portion $6^b$ of the cam 6 it establishes a bridge on the conductor 17 and causes energization of the electromagnet G. When it bears against the portion of large diameter $6^a$ of the cam 6, it establishes a bridge on the conductor 20 and either feeds the electromagnet E by the extension of this conductor 20 or causes energization of the electromagnet F by way of the conductor 23, depending on the position of the double switch III/IV;

When the switch III/IV bears against the portion $6^c$ of the cam 6 it establishes a bridge on the conductor 23 and energizes the electromagnet F. When it bears against the portion 6$^b$ of the cam 6 it establishes a bridge on the conductor 20 and energizes the electromagnet E.

For reasons of clarity and simplification, two conductors connecting the conductors 20 and 23 to the time delay device T for the purpose of cutting off the injection of fuel when changing speed, have not been shown.

The electric part of the control device is completed by a number of switches for locking the transmission ratios and returning to the second speed. The various switches control the energization of the electrovalve $E_v$.

Thus, this electrovalve $E_v$ which is fed by a conductor 24 connected to the negative conductor L$^2$ of the general supply line, is also connected to the positive conductor L$^1$ of this line by a conductor 25 in which the studs of a switch X are disposed, the contact piece of this switch being actuated manually by the driver.

The electrovalve $E_v$ is also connected by a conductor 26 to a point of the second speed conductor 17 located between the switch A and the switch II/III. Connected in series in this conductor 26 are studs of the switch Y for returning to second speed actuated by the second diaphragm servo V$^2$ and the switch Z locking the engaged speed co-operating with the disc cam 10 of the accelerator pedal H.

(II) OPERATION

There will be described in succession: the automatic operation of the control device according to the invention, the modification of the automatic operation by the actuation of the locking switches X, Y, and Z, and then conditions of driving the vehicle which illustrate the functions of the various switches of the electric control.

(1) Automatic operation

*Neutral.*—The contact piece O being depressed, the other control pieces I, III, AR and A of the manual selector $S_m$ are in position on the rest studs $r$. As can be seen in the diagram shown in FIG. 1, none of the electromagnets E, F, G is supplied, so that the vehicle remains stationary.

*Moving off in second speed (FIG. 2).*—The depression of the contact piece A of the manual selector $S_m$ results in connection to the operation studs $t$ and passage of current in the conductor 17. As the engine of the vehicle is running slowly and the pressure of oil leading to the diaphragm servo V$^1$ is relatively low, the stepped cam 6 is in the lower position shown in FIG. 2 under the prevailing action of the spring 7. The contact piece of the switch II/III bears against the portion 6$^b$ of the cam 6 and closes the second speed conductor 17 so that the electromagnet G is fed. The second speed is therefore engaged and, upon acceleration, the vehicle moves off.

*Third speed III (FIG. 3).*—When accelerating, the speed of the shaft N increases and the pressure of oil supplied by the pilot device P also increases. The oil fed to the servo V$^1$ compresses the spring 7, shifts the cam 6 and causes the contact piece of the switch II/III to pass to the following step which is the portion 6$^a$ of the cam, whereas the contact piece of the switch III/IV remains on the portion 6$^b$. The current then passes from the conductor 17 through the line 20 to the switch III/IV, then passes from the latter by way of the line 23 of the third speed which feeds the electromagnet F. The third speed is thus engaged.

*Fourth speed IV* (FIG. 4).—As the speed of the vehicle continues to increase, the oil pressure furnished by the pilot device P and the conduit 3 increases still more and the servo V$^1$ compresses still further the spring 7 and continues to shift the cam 6. The contact piece of the switch II/III remains on the portion 6$^a$ of this slide or cam but the contact piece of the switch III/IV passes from the portion 6$^c$ to the portion 6$^b$ and thus opens the line 23 and establishes a bridge on the line 20. The electromagnet E of the fourth speed is thus fed by way of the conductors 17 and 20.

*Changing down the speeds.*—When the speed of the vehicle and shaft N decreases, the pressure of the liquid in the conduit 3 drops and the thrust of the spring 7 prevails and shifts the cam 6 in the opposite direction. Thus, the speeds are changed down. Note that the switches II/III and III/IV, which in practice consist of microswitches having a differential travel, automatically stagger the vehicle speeds at which occur the changes in the transmission ratio for changing up and the changes in the transmission ratio for changing down.

*Locking and position of the accelerator pedal.*—If the contact piece of the manual control switch X is depressed by the driver, the electrovalve $E_v$ is fed through the conductors 24 and 25. The conduit 3 is closed by the electrovalve $E_v$ and the pilot device P no longer has effect on the diaphragm servo V$^1$. The oil is trapped in the latter and, owing to the incompressibility of the oil, the cam 6 is held stationary. Consequently, the engaged speed ratio, whether it is the ratio II, III or IV, remains locked and cannot in any case be replaced by another transmission ratio, even if the speed of the vehicle increases or decreases.

Beyond a given speed of the vehicle and shaft N, the pilot device P supplies oil to the servo V$^2$ by way of the conduit 9 at a pressure which is sufficient to close the switch Y. However, nothing occurs so long as the switch Z is not itself closed since the two switches Y and Z are connected in series in the same line 26. Consequently nothing happens so long as the accelerator pedal H is sufficiently depressed to present the portion $ab$ of the disc cam 10 in front of the contact piece of the switch Z. However, as soon as the accelerator pedal is raised, so that the portion $cd$ of the disc cam is presented in front of the switch Z, the electrovalve $E_v$ is fed by the circuit 26 so that, as before, the engaged transmission ratio is locked whether it be the second or fourth speed.

*Unlocking of the engaged speed ratio and return to the second speed (II).*—If the accelerator pedal is raised and if the vehicle slows down below a given speed, the pressure of oil supplied by the pilot device P to the conduit 9 drops to the point where the switch Y is released. Under these conditions, the feed conductor 26 of the electrovalve $E_v$ is cut off so that this electrovalve is released and again opens the conduit 3 and allows the diaphragm servo V$^1$ to empty to the tank. Under these conditions, the cam 6 moves to the position shown in FIG. 2 and engages the second speed II.

It will be noted that depression of the accelerator pedal H results in an acceleration of the driven shaft N of the gearbox and consequently an increase in the oil pressure furnished by the pilot device P, an increase in the pressure of this oil in the servo V$^1$ and a progressive compression of the conical spring 7. If the position of the abutment 8 is varied in the known manner, and bearing in mind the law of compression of this spring as a function of the force exerted thereon, the pressure of the oil should be higher for shifting the cam 6, which corresponds to a higher speed of rotation of the pilot device P and therefore to changes at a higher engine speed.

(2) Driving the vehicle

*Normal operation—Moving off on the flat.*—The double contact piece of the switch A is depressed towards the operating studs $t$. The vehicle starts to move off in second speed and changes automatically to third and fourth speed.

Changing down the speeds in effected automatically. If it is desired to temporarily benefit from the full power of the engine, the engaged transmission ratio can be maintained by depressing the contact piece of the manual control locking switch X.

As soon as the contact piece of the switch X is released, the transmission ratio, corresponding to the portion of the cam 6 given by the pressure of the oil in the conduit 3, is engaged.

*Moving off on a slope.*—Instead of depressing the contact piece of the double switch A, the contact piece of the switch I of the first speed is depressed. This contact piece engages the operation studs *t* and the electromagnets F and G are fed through the conductors 16, 13, 14, 15, the contact pieces of the switches III and AR being in position on the rest studs *r*, and the conductors 12 of the electromagnets F and G.

As soon as the vehicle has gathered speed, the contact piece of the switch A is depressed and the gearbox is controlled automatically, as described hereinbefore.

*Using the engine as a brake.*—If the circuit is fed normally, the contact piece of the switch III can be depressed towards the operation studs *t* as soon as the speed of the vehicle is considered sufficient. Under these conditions, the electromagnet F of the third speed is directly fed by way of the conductor 16 of the switch III and the conductor 12. Under these conditions, in view of the fact that no inopportune changing to fourth speed is to be feared, benefit is had of the braking effect of the engine in third speed. If the vehicle descends a very steep slope, the accelerator pedal H is released so that the second speed is in any case engaged owing to the low pressure of oil in the conduit 3 and the locking is effected, for more safety, by the manual switch X which feeds the electro-valve $E_v$. Normal driving is resumed by releasing the contact piece of this switch X and once more depressing the accelerator pedal H.

If the vehicle descends an exceptionally steep slope, it is necessary to brake almost to stoppage so as to abandon automatic operation and depress the contact piece of the first speed switch I.

*Reverse speed.*—Before changing to reverse speed, the contact piece O corresponding to neutral must be depressed and then the contact piece of the switch AR must be depressed onto the operation studs *t*. At this moment, it is the electromagnets E and F which are fed by the conductor 16 of the switch AR, the conductor 15, the studs *r* of the switch A, and the conductors 13 and 14 of the switches I and II whose contact pieces are on the rest studs *r*.

To change to forward speed, it is necessary to once more depress the contact piece of the contactor AR which, by means of a mechanical device (not shown) and in the known manner, returns to the rest studs *r*.

(III) ADVANTAGES OF THE DEVICE

As can be seen, the driver is relieved of any worry of gear-box operation and can concentrate his entire attention on the acceleration, the braking of the vehicle and the direction assumed by the vehicle as a result of this automatic control device. However, he remains master of the control and can eliminate automatic operation by means of the locking switches X and Y and the accelerator pedal H combined with the disc cam 10 and the switch Y.

The disc cam 10 combined with the accelerator pedal H permits a very simple and very effective automatic control of the operation of the gearbox by the speed of the engine M when the speed of the vehicle is high and not only adds pleasure to the driving but considerable safety.

The driver also retains the possibility of engaging and maintaining the first and third speeds and reverse speed, by means of the manual selector $S_m$ and owning to the double switch A which, in the position of rest, allows the feeding of the electromagnets selected by one of the other contact pieces of the manual selector and, in the operative position, allows the passage of the current through the automatic operation switches II/III and III/IV.

As concerns more particularly the disc cam 10 combined with the accelerator pedal H, it should be mentioned that it can be set angularly relative to the pedal H (FIG. 6) by rotation about the pivot pin 11 of the pedal H and by clamping on this pin in the required manner so as to increase or decrease, as desired, the angle at the centre of the portion *ab* and thus result in the locking of a transmission ratio as a function of the position of the accelerator pedal H.

Although a specific embodiment of the invention has been described, many modifications and changes may be made therein without departing from the scope of the invention as defined in the appended claims.

Thus, instead of being cylindrical, the stepped cam 6 can be constructed in the form of a ramp whose operative face has three plane portions stepped at different levels, in accordance with the profile of the generatices of the cam 6 shown in FIG. 1.

Having now described my invention what I claim as new and desire to secure by Letters Patent is:

1. A control device for changing speeds of a vehicle gearbox, said device comprising in combination a hydraulic pilot device responsive to the output shaft speed of said gearbox, a mechanical automatic change speed means, a hydraulic actuating device for actuating said automatic change speed means, a first conduit putting said hydraulic actuating device in communication with said pilot device which feeds to said hydraulic device oil under a pressure which varies with the speed of rotation of said output shaft, electric switches controlling the automatic engagement of said speeds and associated with said mechanical means to be actuated by said mechanical means and, in said first conduit, an electromagnetically operated valve for closing said first conduit for locking the engaged transmission ratio, said valve comprising two energization circuits one of which comprises a manually-operated normally open first switch whereas the other of said circuits comprises two normally open second switches connected in series, one of said second switches being combined with means responsive to said pressure so as to be closed automatically thereby when said pressure exceeds a predetermined value, the other of said second switches being combined with means adapted to close said other second switch upon closure of a vehicle throttle.

2. A device as claimed in claim 1, wherein said two circuits are parallel but comprise a common portion in which the winding of said electromagnetically operated valve is placed.

3. A device as claimed in claim 1, wherein said means responsive to said pressure for closing said one of said second switches is a hydraulic device connected to the pilot device by a second conduit connected to the first conduit on the upstream side of said electromagnetically operated valve.

4. A device as claimed in claim 1, wherein said means adapted to close said other of said second switches comprises a disc cam adapted to be fixed to the accelerator pedal of a vehicle.

5. A device as claimed in claim 4. wherein the disc cam comprises a circular portion of small radius followed by a circular portion of large radius and is centered on the pivot pin of the pedal, whereby, depending on the movements of said pedal, the circular portion of small radius leaves said other of said second switches open and the circular portion of larger radius closes said other of said second switches.

6. A device as claimed in claim 5, wherein the disc cam is angularly keyed on the pivot pin of the accelerator pedal so as to permit adjustment of the angular position of said circular portion of small radius as desired.

7. A device as claimed in claim 3, wherein said hydraulic actuating device is a diaphragm servo.

8. A device as claimed in claim 1, wherein said mechanical change speed means is a stepped cam having three steps.

9. A transmission unit for an automobile vehicle comprising in combination a gearbox of the type having permanently meshed gears and in which certain forward speeds are engaged by means of an automatic distribution of fluid under pressure through actuators tightening brake bands and a control device, said control device comprising in combination a hydraulic pilot device responsive to the output shaft speed of said gearbox, a mechanical automatic change speed means, a hydraulic actuating device for actuating said automatic change speed means, a first conduit putting said hydraulic actuating device in communication with said pilot device which feeds to said hydraulic device oil under a pressure which varies with the speed of rotation of said output shaft, electric switches controlling the automatic engagement of said speeds and associated with said mechanical means to be actuated by said mechanical means and, in said first conduit, an electromagnetically operated valve for closing said first conduit for locking the engaged transmission ratio, said valve comprising two energization circuits one of which comprises a manually-operated normally open first switch whereas the other of said circuits comprises two normally open second switches connected in series, one of said second switches being combined with means responsive to said pressure so as to be closed automatically thereby when said pressure exceeds a predetermined value, the other of said second switches being combined with means adapted to close said other second switch upon closure of a vehicle throttle.

10. A device as claimed in claim 3, wherein said hydraulic device responsive to said pressure is a diaphragm servo.

References Cited
UNITED STATES PATENTS 2,842,008  7/1958  Maurice et al. _____ 74—870
3,354,751  11/1967  Beig _____ 74—752

ARTHUR T. McKEON, Primary Examiner

U.S. Cl. X.R.
74—854, 870